United States Patent

[11] 3,552,407

| [72] | Inventor | Itsuro Hirano |
| | | 2 Sendagaya 1-chome, Shibuya-ku, Tokyo, Japan |
| [21] | Appl. No. | 782,879 |
| [22] | Filed | Dec. 11, 1968 |
| [45] | Patented | Jan. 5, 1971 |
| [32] | Priority | Dec. 20, 1967 |
| [33] | | Japan |
| [31] | | 42/81,154 |

[54] METHOD OF ADJUSTING A BUTTERFLY VALVE SEAL
5 Claims, 5 Drawing Figs.

| [52] | U.S. Cl. | 137/15, 251/306, 251/307 |
| [51] | Int. Cl. | F16k 1/22, F16k 1/228 |
| [50] | Field of Search | 251/173, 305—308, 358; 277/235 |

[56] References Cited
UNITED STATES PATENTS

| 2,488,380 | 11/1949 | Danks | 251/173 |
| 2,883,149 | 4/1959 | Fiorentini | 251/306 |
| 3,059,897 | 10/1962 | Jensen | 251/306 |
| 3,399,863 | 9/1968 | Fawkes | 251/306 |

FOREIGN PATENTS

| 695,037 | 9/1964 | Canada | 251/306 |
| 908,244 | 10/1962 | Great Britain | 251/306 |

*Primary Examiner*—Henry T. Klinksiek
*Attorney*—Blum, Moscovitz, Friedman & Kaplan ABSTRACT: A butterfly valve characterized by the provision of a ring packing kept displaceably and deformably in place by either the valve seat or the butterfly leaf. The ring packing is of an elastomer in which a metal wire ring is embedded concentrically with the ring. A fibrous material may also be additionally embedded in the ring packing mounted in a radially opened peripheral groove formed on the valve seat or the butterfly leaf, in which the ring packing is displaceable. The metal wire ring facilitates restoring the ring packing elastically from an irregular compressed form to a proper regular form, for example, towards a true circle and/or to ease bringing the ring packing into a complete and proper closed position, without collapsing, buckling and/or yielding the metal wire ring.

PATENTED JAN 5 1971 3,552,407

METHOD OF ADJUSTING A BUTTERFLY VALVE SEAL

The elastomer packing for completely closing a butterfly valve has been well known. Such an elastomer packing is fully or partly secured to a supporting member which is either the valve seat or the butterfly leaf, so that it is impossible to displace the packing with respect to the supporting member, resulting in requiring a high accuracy in manufacturing both the packing and the supporting member. If the packing is made soft, a part of the packing to be brought into contact with the matching member is plastically deformed ending in being separated from the supporting member due to the force sucking towards vacuum produced behind the valve in the downstream side thereof or at least greatly damaged as so as to be unsatisfactory as packing. If the packing is made hard, the sealability of the valve is lowered by virtue of such a structure as above.

SUMMARY OF THE INVENTION

Briefly stated in accordance with one aspect of this invention, there is provided a butterfly valve comprising a valve seat, a butterfly leaf, and a ring packing arranged therebetween. The ring packing is of an elastomer in which at least a metal wire ring is embedded concentrically. A fibrous material may also be embedded in the ring packing. Either the valve seat or the butterfly leaf is provided with a radially opened circular or elliptic circumferential groove in which the ring packing is mounted displaceably.

By virtue of the construction as above in accordance with this invention, it is quite possible to overcome the drawbacks which arise when the soft elastomer is used as mentioned hereinbefore.

The metal wire ring may be of steel, such as music wire, or of more plastic metal, such as aluminum. In case of music wire, the elasticity contributes to a merit. In case of aluminum wire, the plasticity contributes to another merit.

When a butterfly leaf is approaching the completely closed position in the process of the operation, it is inevitable that the ring packing is once deformed to an ellipse due to the pressure of the valve seat and then restored towards a true circle just when the same is brought into the completely closed position. In accordance with this invention, the music wire ring facilitates the restoration by virtue of the elasticity so that the closed position of the ring packing is achieved more easily and completely than in case of a ring packing not provided with such an elastic wire ring. If a ring packing has not a wire ring embedded therein, it becomes more oblong due to the local liquid pressure so that it is more difficult to restore the ring packing towards the true circle for the complete closed position, as shown in FIGS. 3A and 3B. In case where the butterfly leaf is elliptic, the above merit is also true. In this case, the true circle is to be replaced by a more rounded ellipse.

In case an aluminum wire ring is embedded in the ring packing, it is more easily and promptly possible that the ring packing gets to sit well even if the accuracy of the butterfly valve is lower. Even if the butterfly leaf and/or the valve seat are somewhat irregular in shape, the ring packing having an aluminum wire ring embedded therein may be deformed quickly and permanently without any tendency of being torn by liquid pressure, ending in to match well with such parts by virtue of the plasticity of the aluminum wire ring.

In either case of the elastic core or the plastic core of the ring packing, it is significant that the ring packing is mounted freely in a radially opened circular or elliptic circumferential groove in such a manner that the ring packing is displaceable radially in the groove. In the process of closure of the butterfly valve, the ring packing encounters local and, in general, radial pressure. In this stage, in accordance with this invention, the ring packing is characterized by being displaced rather than deformed. The ring packing in accordance with this invention is at first displaced so as to retire from the local pressure and to approach a position where the radial pressure is circumferentially equalized. This displacement of the ring packing is of eccentric. That is, the pressured part is retired, the opposite part is protruded, and the intermediate parts are displaced circumferentially, in the groove without a substantial deformation. Secondarily, the elastomer such as nervous rubber or certain synthetic resin is deformed substantially evenly at all parts around the periphery when the butterfly leaf arrives at the complete closed position. In view of the action as above, it is preferred that the metal wire ring is embedded in a concentric position of the ring packing, which is near the bottom of the groove.

In accordance with this invention, a fibrous material may also be embedded in the ring packing. The fibrous material is arranged around the metal wire ring and extended towards the part to be exposed out of the groove. By virtue of the fibrous material, the elastomer of the ring packing is prevented from an undue and critical deformation and separation from the metal wire ring. The fibrous material is not arranged in the superficies of the elastomer ring packing for facilitating deformation of the elastomer, and may be quite omitted in case of a small valve and/or a low liquid pressure.

By virtue of this invention, many drawbacks in the prior art are overcome. In addition, the torque of opening and closing the valve is reduced by virtue of the restoring action of the music wire ring to a regular shape. In case of a less stiff metal such as aluminum, the same effect is obtained by virtue of the absence of local irregular pressures.

BRIEF DESCRIPTION OF THE DRAWING

The invention will be better understood and other objects and additional advantages of the invention will become apparent upon perusal of the following description taken in connection with the drawings, in which.

DESCRIPTION OF THE EMBODIMENTS

Figure 1:
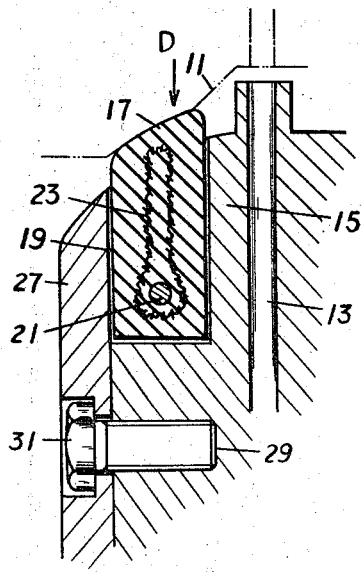
FIG. 1 is a cross-sectional view of a part of a butterfly leaf and an associated part of a valve seat thereto embodying this invention in closed position.

Referring more particularly to the drawings, the preferred embodiments of this invention will now be described; however, this description will be understood to be illustrative of the invention and not as limiting it to the particular construction shown and described. The butterfly valve shown in FIG. 1 is provided with a valve stem 13 arranged along a chord of a butterfly leaf 15 and extended through a valve seat 11 on the inner wall of a pipe.

The butterfly leaf 15 is formed with a peripheral groove 19, which is radially opened along the periphery. A ring packing 17 of an elastomer is mounted in the peripheral groove 19 in such a manner that ti is possible to displace the ring packing 17 radially. Although there is illustrated a clearance along the wall of the groove 19 for facilitating the expression, there are not actual clearances between the sidewalls of the groove 19 and the ring packing 17. Notwithstanding the ring packing 17 which is simply mounted but not fixed to the wall is capable of moving on the wall of the groove 19 readily.

Numeral 21 denotes a metal wire ring arranged concentrically with and near the bottom or the inner periphery of the ring packing 17, . Numeral 23 denotes fibrous material twined around the metal wire ring 21 and extended towards the outer periphery of the ring packing 17 in such a manner as leaving the superficies of the ring packing 17 free from the fibrous material 23 for free deformation thereof. By virtue of the metal wire ring 21 embedded in the ring packing 17, when it is pressed locally, the ring packing 17 is displaceable as a whole in the groove 19, while transmitting the local pressure D circumferentially evenly to all parts of the ring packing 17. After the displacement has been maximized, the ring packing 17 is deformed into an ellipse or an oval before the butterfly leaf 15 is brought into the close position and restored towards the true circle just when the complete closure is achieved. The deformation and the restoration are assured by the elasticity or the metal wire ring 21, so that the final complete closure of the butterfly valve with the elastic outer periphery of the ring packing 17 is more quickly achieved and the opening and closing torque is reduced.

Figure 2:
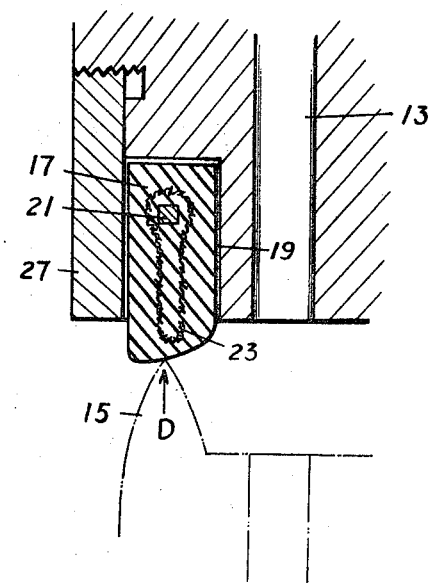
FIG. 2 is a cross-sectional view similar to FIG. 1, but the ring packing is held in place by the valve seat embodying this invention.

While the ring packing 17 is carried by the butterfly leaf 15 in the embodiment shown in FIG. 1, the ring packing 17 is carried by the valve seat in another embodiment shown in FIG. 2. In this embodiment, the internally peripheral radially opened groove 19 is provided on the inside wall of the valve seat 11, in which the ring packing 17 is arranged so as to protrude the inner edge thereof internally radially. A butterfly leaf 15 which is not provided with the ring packing on the peripheral edge thereof, is adapted to be engaged with the ring packing 17 carried by the valve seat 11. The action and the merits of the ring packing 17 in accordance with this invention in this embodiment is quite the same with those in the above embodiment.

Figure 3:
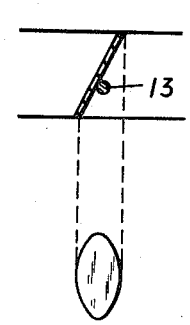
FIGS. 3A and 3B are explanatory views for the deformation of a ring packing from an ellipse towards the true circle.
Figure 3:
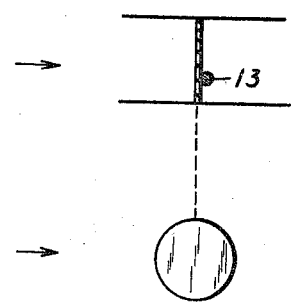

In accordance with this invention, the music wire ring 21 embedded in the ring packing 17 is elastically deformed from the true circle to the ellipse in the intermediate position as shown in FIG. 3A so that the ring packing 17 is capable of restoring towards the true circle elastically and resisting the force of passing liquid, resulting in reducing the torque for the closing operation of the valve. This is similarly true in case the ring packing 17 is carried by the valve seat 11. In accordance with this invention, the ring packing 17 is reinforced by the fibrous material 23 embedded seclusively therein. By virtue of this reinforcement the elastomer of the ring packing 17 is prevented from an excessive deformation and separation from the metal wire ring 21.

Figure 4:
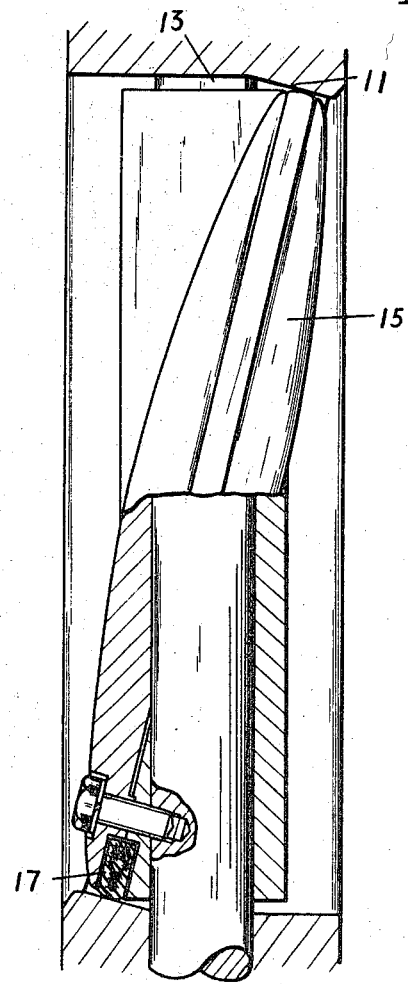
FIG. 4 is a cross-sectional view of a part of still another embodiment in accordance with this invention.

FIG. 4 illustrates still another embodiment in accordance with this invention, in which the valve stem 13 intersects with the butterfly leaf 15 at a certain angle at the center of the butterfly leaf 15 so that the butterfly valve is in the full open position when the to of the butterfly leaf 15 is turned just behind the valve stem 13 and the bottom of the butterfly leaf 15 is positioned in front of the stem 13 in FIG. 4. The ring packing 17 is carried by the butterfly leaf 15 similarly to the embodiment shown in FIG. 1 and constructed similarly thereto. The manner of deformation and restoration of the ring packing 17 when the butterfly leaf 15 is operated is also similar to that of the embodiment shown in FIG. 1 and similarly meritorious. In case of a butterfly valve, of which the butterfly leaf is positioned with respect to the valve stem similarly to the above embodiment as shown in FIG. 4, it is also possible to arrange the ring packing in a radially opened inner peripheral groove formed in the valve seat similarly to the embodiment as shown in FIG. 2.

As to the mounting manner of a ring packing 17 in a radially opened peripheral groove 19 of a butterfly leaf 15, it is well known that it is necessary to provide a cover 27 positioned axially just on the groove 19 and insert the ring packing 17 into the groove 19 axially by removing the cover 27. In accordance with this invention, the ring packing 17 is placed in the groove 19 also in such a manner as above. In addition, it is necessary that the axial depth of the groove 19 is such that the ring packing 17 is capable of displacing therein radially after the cover 27 has been screwed down into close contact with the butterfly leaf 15.

In order to bring the ring packing 17 into the position as above, it is preferred to position the butterfly leaf 15 at its the full open position and remove the cover 27 by unscrewing a bolt 31 out of an internally threaded bore 29 formed in the butterfly leaf 15. A ring packing 17 is placed in the groove 19 by being inserted axially to the end and covered the groove 19, again. It is necessary that the bolt 31 is not screwed down completely again this stage for displacing the ring packing 17 in the groove 19 eccentrically more easily. To this end, it is preferred that the bolt 31 is at first screwed down completely and then unscrewed slightly so that the ring packing 17 is kept in place but easily displaceably. The butterfly lead leaf 15 is then turned to the full closed position where the ring packing 17 adjusts on the valve seat 11 by virtue of its more easily displaceable arrangement in the groove 19. Several opening and full closing operations are repeated for ensuring a preferred position of the ring packing 17 whereupon the bolt 31 is screwed down further.

While particular embodiments of the invention have been illustrated and described, modifications thereof will readily occur to those skilled in the art. It should be understood therefore that the invention is not limited to the particular arrangements disclosed but that the appended claims are intended to cover all modifications which do not depart from the true spirit and scope of the invention.

I claim:

1. A method of setting a ring packing in a groove of a butterfly valve comprising a valve seat, a butterfly leaf, and a ring packing arranged therebetween and being made of a solid elastomeric body so that the cross section of said ring packing is devoid of hollow spaces, said butterfly leaf being movable between open and closed positions with respect to said valve seat, and said butterfly leaf and valve seat forming a pair of groove components one of which is formed with an annular groove the hollow interior of which is directed toward the other when said butterfly leaf is in its closed position, and said ring packing being arranged within said groove of said one component and pressing against the other component when said butterfly leaf is in its closed position, said one component having a body formed with an annular shoulder defining the inner surface and one side of said groove and carrying a cover adjustably fixed to said body and defining the other side of said groove, the steps of initially positioning said cover with respect to said body at a location providing for substantially free radial flexing of said ring packing during opening and closing movement of said leaf, repeatedly opening and closing said leaf to achieve a good sealing with said packing in the closed position of said leaf, and then adjustably fixing said cover to said body in an end position engaging the latter and providing for said ring packing at the outer side faces thereof a force of friction sufficient to retain said packing in place in said groove while still being radially or eccentrically displaceable therein.

2. In a method as recited in claim 1, said valve seat being said component which is made up of said body and cover, the step of turning said butterfly leaf to its fully open position, then removing said cover, axially positioning said ring packing on said body, and replacing said cover to retain said ring packing in said groove of said valve seat, whereupon said butterfly leaf is then repeatedly displaced between its closed and opened positions after said cover is brought into the position providing for the ring packing the relatively free radial movement during the repeatedly opening and closing of the butterfly leaf.

3. A method as recited in claim 1 and wherein said cover is initially tightened all the way to its final position engaging said body and is then backed away from said body to provide for the relatively free movement of said ring packing during the repeated opening and closing movement of the butterfly leaf.

4. A method as recited in claim 1 and wherein said butterfly leaf is said component which has said body and cover, the step of turning said butterfly leaf to its fully open position, then removing the cover, placing the ring packing on the body, and then replacing the cover of the butterfly leaf to provide for the relatively free radial movement of the ring packing during the repeated opening and closing movement of the butterfly leaf.

5. A method of setting a ring packing in a groove of a butterfly leaf of a butterfly valve as claimed in claim 1, in which:
   a cover forming an axial side of said groove is removable by unscrewing a bolt in engagement with said butterfly leaf; and the axial depth between both axial sides of said groove is such that said ring packing is retained in place in s said groove by friction but displaceable eccentrically in said groove by a radial force after said cover has been completely brought into a position in close contact with said butterfly leaf, comprising steps of:

positioning said butterfly valve in its full open position:

removing said cover by unscrewing said bolt;

inserting said ring packing axially into said groove to the other side thereof formed on said butterfly leaf;

placing said cover on said butterfly leaf by screwing said bolt down thereto but not tightly so that said ring packing is kept in place but easily displaceably;

turning said butterfly leaf to the the full closed position;

repeating opening and closing operations of said butterfly valve several times so that said ring packing adjusts on said valve seat; and screwing down said bolt completely so as to bring said cover into the first-named position.